United States Patent
Beekman et al.

(10) Patent No.: US 9,823,385 B1
(45) Date of Patent: Nov. 21, 2017

(54) METHOD AND APPARATUS FOR OPERATING A DOWNHOLE TOOL WITH AN ELECTRONIC PHOTON SOURCE AT DIFFERENT ENDPOINT ENERGIES

(71) Applicant: Schlumberger Technology Corporation, Sugar Land, TX (US)

(72) Inventors: Sicco Beekman, Houston, TX (US); Avtandil Tkabladze, Sugar Land, TX (US); Matthieu Simon, Chaville (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/281,348

(22) Filed: Sep. 30, 2016

(51) Int. Cl.
*G01V 5/08* (2006.01)
*G01V 5/12* (2006.01)

(52) U.S. Cl.
CPC .................... *G01V 5/12* (2013.01)

(58) Field of Classification Search
CPC ................. G01V 5/12; G01V 5/125
See application file for complete search history.

(56) References Cited

U.S. PATENT DOCUMENTS

| | | | |
|---|---|---|---|
| 7,960,687 B1* | 6/2011 | Simon | G01V 5/125 250/269.1 |
| 7,960,689 B2 | 6/2011 | Landrock et al. | |
| 7,991,111 B2 | 8/2011 | Wraight et al. | |
| 2007/0291898 A1* | 12/2007 | Groves | A61B 6/4241 378/51 |
| 2008/0159480 A1* | 7/2008 | Wraight | H01J 35/06 378/89 |
| 2013/0287174 A1* | 10/2013 | Zhou | H01J 35/08 378/91 |
| 2013/0308753 A1* | 11/2013 | Groves | E21B 49/06 378/54 |
| 2016/0274038 A1* | 9/2016 | Brady | G01V 5/12 |
| 2017/0169909 A1 | 6/2017 | Tkabladze et al. | |

* cited by examiner

*Primary Examiner* — Kiho Kim
(74) *Attorney, Agent, or Firm* — Michael Dae (57) ABSTRACT

A system is disclosed for downhole logging. The system comprises a photon source configured to generate photons at different endpoint energies; at least one radiation detector configured to detect photons after interactions with a wellbore, a geological formation surrounding the wellbore, or both; an energy detection system configured to determine an endpoint energy of the photon source; and a processing system configured to determine properties of a wellbore, a geological formation, or both, based on photons detected at the at least one radiation detector and the endpoint energy determined by the energy detection system.

11 Claims, 6 Drawing Sheets

METHOD AND APPARATUS FOR OPERATING A DOWNHOLE TOOL WITH AN ELECTRONIC PHOTON SOURCE AT DIFFERENT ENDPOINT ENERGIES

BACKGROUND

This disclosure relates generally to a downhole tool that generates photons (e.g., x-rays) to measure formation properties and, more particularly, to a downhole tool that operates with an electronic photon source at different endpoint energies.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as admissions of any kind.

To locate and extract resources from a well, a wellbore may be drilled into a geological formation. Downhole tools are placed into the wellbore to identify properties of the downhole environment. A downhole formation density tool, for example, may be deployed within the sub-surface to measure physical properties of a surrounding geological formation. The formation density tool may include a source to emit high-energy photons into the geological formation. Some of the high-energy photons may interact with the geological formation and may then be detected by detectors on the formation density tool. The physical properties of the geological formation and other materials of the downhole environment may be determined from the characteristics of the detected high-energy photons.

In many downhole formation density tools, the high-energy photons have been generated by radioisotopic sources. Because radioisotopic sources may be difficult to acquire, difficult to transport, and difficult to dispose of, some formation density tools may instead use an electronic x-ray generator. X-ray generators may be easier to transport, easier to acquire, and easier to dispose of in comparison to radioisotopic sources. However, depending on the operating conditions, the x-ray generator may not provide a predictable and consistent output of photons. For instance, driving circuits of the x-ray generator may cause the x-ray generator to act differently depending on temperature, voltages, aging, or the like. Indeed, as downhole conditions change, so may the endpoint energies of the x-rays that are generated.

SUMMARY

According to one aspect of the current application, there is disclosed a system comprising a photon source configured to generate photons at different endpoint energies; at least one radiation detector configured to detect photons after interactions with a wellbore, a geological formation surrounding the wellbore, or both; an energy detection system configured to determine an endpoint energy of the photon source; and a processing system configured to determine properties of a wellbore, a geological formation, or both, based on photons detected at the at least one radiation detector and the endpoint energy determined by the energy detection system.

According to another aspect of the currently application, a method is described, where a downhole tool is lowered into a wellbore traversing a geological formation. The downhole tool comprises a photon source capable of operating at different endpoint energies and a detector. Photons are generated by the photon source. Photons, after interacting with the wellbore, the geological formation, or both, are detected by the detector, and the endpoint energy of the photon source is determined by an energy detection system. Certain properties of a wellbore, a geological formation, or both, are then determined based on the photons detected by the detector and the endpoint energy determined by the energy detection system.

In some embodiments, a method of downhole logging is disclosed. The method comprises lowering a downhole tool into a wellbore traversing a geological formation, said downhole tool comprises a photon source and a detector; generating photons by the photon source at different endpoint energies; detecting, by the detector, photons after interacting with the wellbore, the geological formation, or both; and determine properties of a wellbore, a geological formation, or both, based on photons detected by the detector and calibration values predetermined at the different endpoint energies.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, not all features of an actual implementation may be described in the specification. It should be appreciated that in the development of any such actual implementation, as in any engineering or design project, numerous implementation-specific decisions will be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates to a downhole tool that measures properties of a wellbore, a geological formation traversed by the wellbore, or both. The downhole tool is capable of being operated at different endpoint energies of photonic radiation. The wellbore may be cased or uncased. The wellbore may be cemented or not cemented. In this disclosure, the photonic radiation is described as including a spectrum of x-rays, but any suitable form of photonic radiation may be generated. To determine properties of a geological formation, a downhole tool may include an x-ray generator that emits photons (e.g., x-rays) into a geological formation. The x-ray generator may include a high voltage generator that generates a voltage between a source of electrons and a target. Electrons are accelerated by the electric field between electron source (cathode) and target (anode) and impinge on the target, where the deceleration may result in the emission of x-rays also referred to as Bremsstrahlung radiation. Some of the emitted photons may include more energy than others. The maximum possible photon energy, which equals the kinetic energy of the incident electron, is called the endpoint energy. The above description relates to electrons being accelerated by an electrostatic potential difference between electron source and target, where the kinetic energy of the electrons equals the potential difference between source and target multiplied by the charge of the electron. Electrons may be accelerated by other means such as a betatron or a LINAC for example.

Some of the emitted photons may interact with the wellbore, the geological formation, or both, and be detected by a detector of the downhole tool. The detector may provide the data processing system with data indicative of the properties of the detected photons, such as a count rate of the photons, a spectrum of energy levels of the photons, or the like. The photons interact with the geological formation differently depending on the properties of the geological formation and the energy of the photons.

The data processing system may determine the properties of the wellbore, the properties of the geological formation, or both, based on the attenuation of the photons detected by the one or more detectors through the wellbore, the geological formation, or both, which may include energy level and count rate of the detected photons. The properties of the wellbore, the geological formation, or both, may include a formation density, a formation photoelectric factor (PEF), a mud cake thickness, a mud cake density, a mud cake PEF, casing density, casing thickness, cement density, cement thickness and cement presence. The measurement (e.g. the measured count rates and/or the spectrum) is sensitive to formation and borehole properties and the depth of investigation (DOI) may be a function of the emitted x-ray spectrum and its endpoint energy. In addition, different regions (energy windows) of the measured spectrum may exhibit differences in the associated DOI. Using various data analysis techniques, such as spine-and-ribs techniques, forward model techniques, inversion techniques, neural networks, other suitable approaches, or combinations thereof, a data processing system may determine the properties of the geological formation based on the energy of the detected photons (e.g., spectral information) and/or the count rate of the detected photons.

The downhole tool may be characterized and calibrated to a desired energy and photon flux from the x-ray generator to enable the data processing system to determine properties of the geological formation. For example, the downhole tool may be characterized experimentally by placing it in various reference formations to obtain primary calibration measurements. The data processing system and the associated data processing algorithm will be determined and adjusted so as to provide the correct formation and borehole property answers for the given measured reference data points. If the x-ray flux is consistent with the flux used during the determination of the reference (primary calibration) data, the data processing system may then determine the properties of the geological formation in various environments. In some embodiments, the measured reference data points may be complemented by modeled data points where the model is benchmarked to the measured data points.

However, the flux and endpoint energy of an x-ray generator may vary as a function of time, age of the generator and environmental factors such as temperature, which may affect the operating voltage and thus the endpoint energy. This is the case even the tool is initially set to operate at a predetermined endpoint energy. At a given endpoint energy, the total x-ray flux can easily be monitored with an x-ray monitor detector. When the endpoint energies of the photons are not consistent with the characterization of the x-ray based tool, the data processing system may provide results that are inaccurate or incorrect.

Thus, embodiments of the disclosure include a downhole tool having a detector used to acquire data from photons interacting with the geological formation at different endpoint energies. That is, a processing system of the downhole tool may provide data with accurate measurements (e.g., measurement accuracy of a formation density within 0.01 g/cm$^3$ or better) based on characterizing the downhole tool at multiple endpoint energies and measuring endpoint energy and photon flux of the x-ray generator. For example, the downhole tool may include hardware to detect the endpoint energy and photon flux of an x-ray generator. The downhole tool may be characterized using at least two endpoint energy settings. The processing system may obtain parameters based on acquired data and endpoint energy. The processing system may determine a relationship between an intensity of photons at the detector and the intensity of photons at the source for different endpoint energies. By configuring the downhole tool to operate at multiple endpoint energies, the downhole tool may provide data with accurate measurements during fluctuations in endpoint energies. Also, the downhole tool may provide data at different depths of investigation using different source photon energies.

Figure 1:
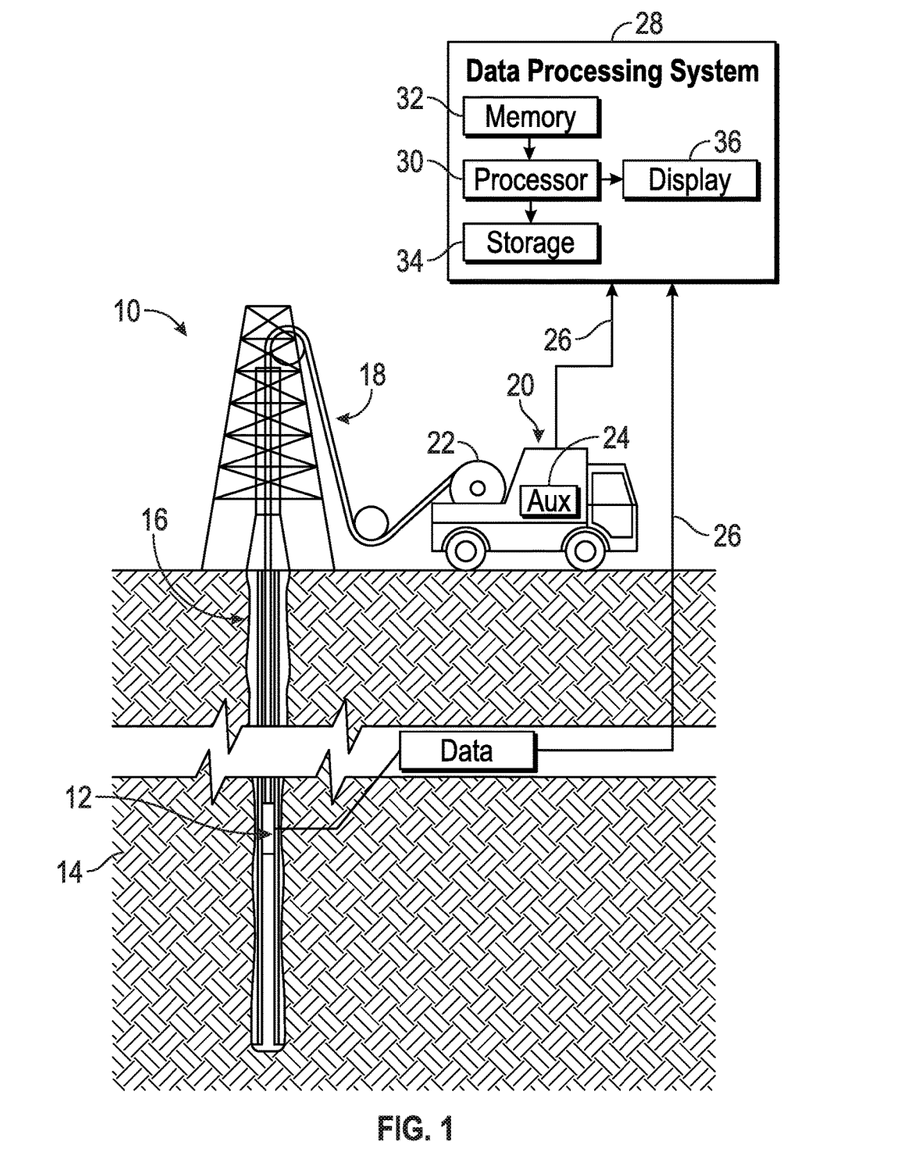
FIG. 1 is a schematic diagram of a drilling system that includes a downhole tool to detect properties of a geological formation adjacent to the downhole tool, in accordance with an embodiment.

With this in mind, FIG. 1 illustrates a well-logging system 10 that may employ the systems and methods of this disclosure. The well-logging system 10 may be used to convey a downhole tool 12 through a geological formation 14 via a wellbore 16. The downhole tool 12 is conveyed on a cable 18 via a logging winch system 20. Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may be spooled and unspooled on a drum 22 and an auxiliary power source 24 may provide energy to the logging winch system 20 and/or the downhole tool 12.

Although the downhole tool 12 is described as a wireline downhole tool, it should be appreciated that any suitable conveyance may be used. For example, the downhole tool 12 may instead be conveyed as a logging-while-drilling (LWD) tool as part of a bottom hole assembly (BHA) of a drill string, conveyed on a slickline or via coiled tubing, and so forth. For the purposes of this disclosure, the downhole tool 12 may be any suitable measurement tool that uses an x-ray generator and a detector to obtain measurements of properties of the geological formation 14.

As discussed further below, the downhole tool 12 may emit photons, such as x-rays, into the geological formation 14, which are detected by the downhole tool 12. Data 26 relating to the wellbore 16 and/or the geological formation 14 may be sent to a data processing system 28. The data processing system 28 may be any electronic data processing system that can be used to carry out the systems and methods of this disclosure. For example, the data processing system 28 may include a processor 30, which may execute instructions stored in memory 32 and/or storage 34. As such, the memory 32 and/or the storage 34 of the data processing system 28 may be any suitable article of manufacture that can store the instructions. The memory 32 and/or the storage 34 may be read-only memory (ROM), random-access memory (RAM), flash memory, an optical storage medium, or a hard disk drive, to name a few examples. A display 36, which may be any suitable electronic display, may display the images generated by the processor 30. The data processing system 28 may be a local component of the logging winch system 20 (e.g., within the downhole tool 12), a remote device that analyzes data from other logging winch systems 20, a device located proximate to the drilling operation, or any combination thereof. In some embodiments, the data processing system 28 may be a mobile computing device (e.g., tablet, smartphone, or laptop) or a server remote from the logging winch system 20.

Figure 2:
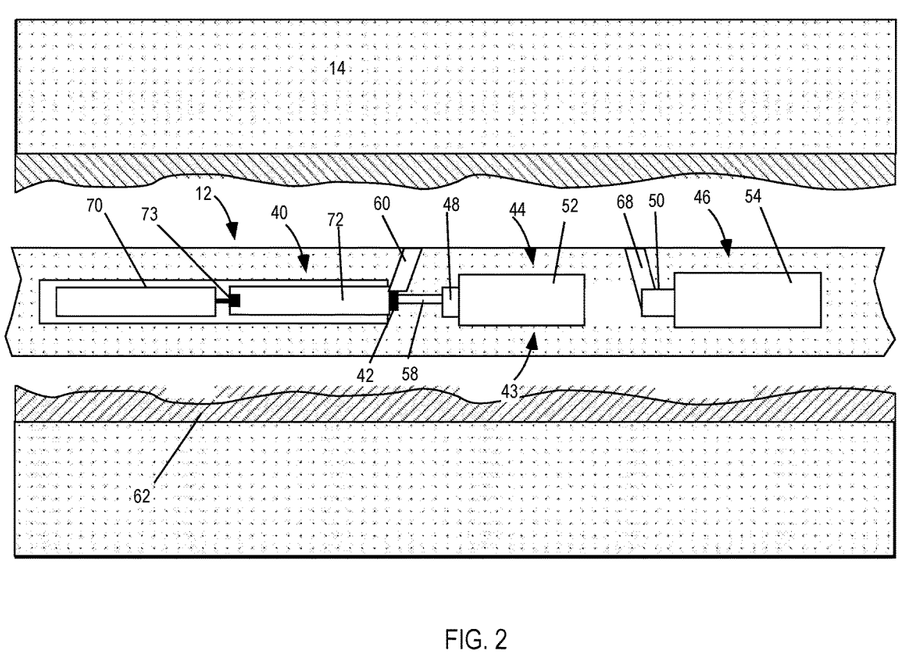
FIG. 2 is a schematic diagram of the downhole tool of FIG. 1 that is characterized to detect characteristics of the geological formation at different endpoint energies, in accordance with an embodiment.

FIG. 2 is a schematic diagram of the downhole tool 12 that operates at different endpoint energies to detect physical characteristics of the geological formation 14. The downhole tool 12 includes an x-ray generator 40 comprising voltage generator 70 and an x-ray tube 72 that may generate voltages of 150 kV, 200 kV, or any other voltage suitable to form an electric field between a cathode 73 and one or more generator targets 42 (e.g. anodes). While an embodiment utilizing a DC x-ray generator is described in detail below, any generator suitable to generate photons of the desired energy may be used. Further, while the downhole tool 12 is shown as having two detectors 44 and 46 (e.g. a reference detector 44 and a measurement detector 46), any suitable number of detectors may be used.

The detectors 44 and 46 may each include a scintillator 48 and 50, respectively, that absorbs the photons and emits light based on the energy of the absorbed photons. For example, each emission of light may count as a detected photon (e.g., thereby adding one to a count rate of the detector). Further, each detector 44 and 46 may include a photomultiplier 52 and 54, respectively, operatively coupled to the respective scintillator 48 and 50 to detect the light emitted by the scintillator 48 and 50. The photomultiplier 52 and 54 may output an electrical signal based on the detected light of the scintillator 48 and 50 to the data processing system 28. As mentioned above, the data processing system 28 may process the electrical signals from the photomultiplier 52 and 54 at the surface (e.g., as the data 26), at the downhole tool 12, or a combination thereof. As such, the downhole tool 12 may include hardware similar to the data processing system 28 (e.g., processor 30, memory 32, storage 34, etc.). In some embodiments, the detectors 44 and 46 may be communicatively coupled to the data processing system 28 to communicate the data 26 related to the electrical signals indicative of the detected photons. The downhole tool 12 may use collimation channels 58, 60 and/or 68 to obtain the desired direction of photons.

During the drilling process, drilling fluid, commonly referred to as "mud" or "drilling mud," may be pumped into the borehole, for example, to cool and/or lubricate the drill bit and to evacuate the drill cuttings to the surface. Over time, a layer of the solid particles, commonly referred to as "mud cake," may form along parts of the wall of the borehole. This may happen when drilling fluid enters the formation while the solids in the fluid that cannot enter the formation form a mud cake at the borehole wall. In the illustrated embodiment, the wellbore 16 includes mud cake 62 and/or standoff between the downhole tool 12 and the geological formation 14. The data processing system 28 may determine properties of the geological formation 14 and/or the mud cake 62, such as formation density, formation photoelectric factor (PEF), mud cake thickness, mud cake density, and mud cake PEF, based at least in part on the number and energy of photons detected by the measurement detector 46. The PEF may indicate the lithology (e.g., elemental composition) of the geological formation, such as the type of rocks. The data processing system 28 may receive data from the measurement detector 46 indicating count rates and/or energy levels of the photons at the measurement detector 46. The measured photon flux (e.g. energy and count rate of the detected photons) may exhibit different sensitivity to the properties of the geological formation 14, the mud cake 62, tool stand off or borehole fluid composition and density. For example, the count rate of photons at lower energies may depend more on the type of rock of the geological formation 14, characterized by the PEF of the geological formation 14. Conversely, the count rate of photons at higher energies may depend more on the density of the geological formation 14 than the count rate of the photons at lower energies. The data processing system 28 may determine the properties of the geological formation 14 based on count rates of photons at various energies indicative of the sensitivity of the interaction of photons to properties of the geological formation. For example, the data processing system 28 may perform spine-and-ribs techniques, forward model techniques, inversion techniques, neural networks, or other suitable approaches as well as combinations thereof, to determine the properties of the geological formation 14 and the mud cake 62 and/or standoff, for example.

To configure the downhole tool 12 to operate at multiple endpoint energies, the data processing system 28 may determine or acquire the endpoint energy and photon flux from the x-ray generator. In some embodiments, the endpoint energy may be determined from an operation parameter, such as a magnetic field in a betatron or the high voltage of a straight accelerator. For example, in the illustrated embodiment, the downhole tool 12 includes an energy detection system 43 that includes hardware, such as the reference detector 44, to measure radiation from the x-ray source. While the reference detector 44 is shown as detecting the intensity and energy distribution of the photons emitted using a scintillation detector within the downhole tool 12, any reference detector 44 that may be insensitive to the geological formation and that is capable of providing a reference signal indicative of flux and endpoint energy may be used. The reference detector or detectors may be calibrated by determining the photon flux and/or photon energy distribution at various know endpoint energies. In yet another embodiment the photon flux may be determined based on the operating parameters of the x-ray generator such as a measured electron beam current and a measured potential difference between the cathode 73 and the target or targets 42.

Figure 3:
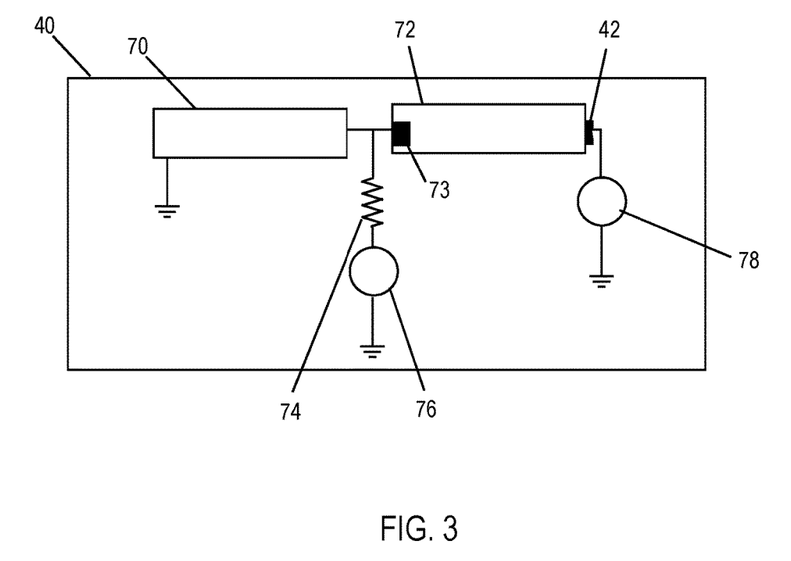
FIG. 3 is a schematic diagram of a generator of the downhole tool of FIG. 1 having sensors to measure signals indicative of energy and photon flux of the generator, in accordance with an embodiment.

FIG. 3 is a schematic diagram of the x-ray generator 40 having a voltage source 70. In the illustrated embodiment, the x-ray generator 40 includes an x-ray tube 72 connected to the voltage source 70 to provide the electrical potential difference between the x-ray tube cathode 73 and the x-ray tube target 42. The x-ray tube 72 may include a cathode 73 that emits electrons within the x-ray tube 72 that accelerate towards the generator target 42. As the electrons decelerate due to contacting (e.g., colliding with) the generator target 42, which may be gold (Au), tungsten, or the like, the deceleration may cause photons, such as high-energy photons (e.g., x-rays) to be emitted as Bremsstrahlung radiation. At least some of the photons may be high-energy photons of an energy sufficient to cause at least a portion of the photons to scatter (e.g., Compton scattering) off elements of the geological formation 14 and to be detected by the detectors 44 and 46.

To configure the downhole tool 12 to determine properties of the geological formation 14 at different endpoint energies, the data processing system 28 may acquire an accurate measurement of the source energy and photon flux of the generator 40. As discussed above in FIG. 2, the data processing system 28 may acquire measurements of radiation from any suitable energy detection system 43, such as the reference detector 44. As mentioned above, the energy detection system 43 may include hardware, such as circuitry, sensors, or processing systems (e.g., processing system 28). For instance, in the illustrated embodiment in FIG. 3, the downhole tool 12 includes another energy detection system having a bleed resistor 74 coupled to a first current sensor 76 and a second current sensor 78 coupled to the generator target 42. The current through the first current sensor 76 is a measurement of the high voltage applied to the cathode and, as the target is at ground potential in this embodiment, a measure of the potential difference between the cathode and the target. This potential difference corresponds to the endpoint energy of the x-ray spectrum. The current through the second current sensor 78 may correspond to the electron beam current impinging on the target and may be a measure of the x-ray flux at a given end point energy provided by the measurement of the first current sensor 76. As such, the data processing system 28 may determine the source energy and flux of the x-ray generator 40 based on signals indicative of the current through the first current sensor 76 and the current through the second current sensor 78.

Figure 4:
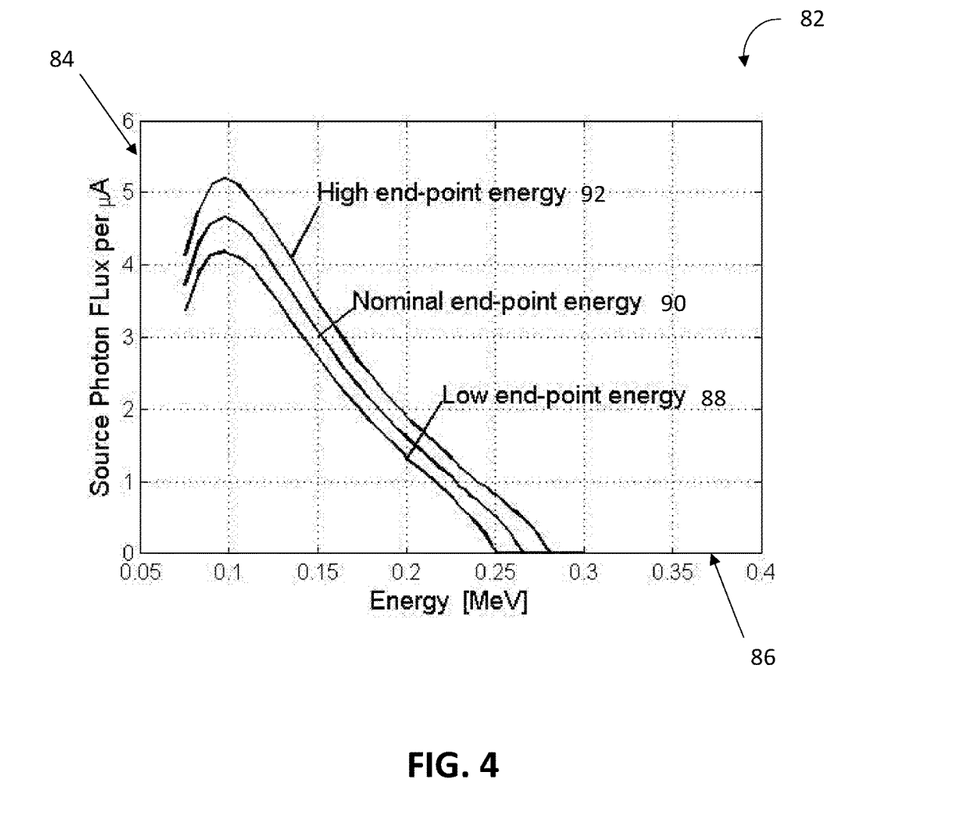
FIG. 4 is a graph of photon flux with respect to photon energy of photons from the generator of FIG. 3, in accordance with an embodiment.

FIG. 4 is a graph of source photon flux per microampere (μA), shown on the ordinate 84, with respect to energy, shown on the abscissa 86. As shown in the graph 82, various endpoint energies may have different energy profiles 88, 90, and 92 of photon flux from the source. For example, a lower endpoint energy profile 88 may determine different characteristics for the same formation compared to the nominal endpoint energy profile 90. Similarly, the high endpoint energy profile 92 may provide different characteristics for the same formation compared to the nominal endpoint energy profile 90. The downhole tool may be characterized at different endpoint energies.

As discussed above, the downhole tool 12 may include the reference detector 44 to measure radiation from the x-ray source, a scintillation detector, a bleed resistor, or any other suitable system and method or combinations thereof to acquire the flux and energy profile of the x-ray source. Further, the downhole tool 12 may be calibrated in a manner in which the downhole tool 12 is placed in various reference formations with known properties and borehole conditions. To characterize the tool 12, the data processing circuitry 28 may determine a relationship between intensity of the source, intensity and energy distribution of the photons detected by the detector, and properties of the formation and borehole. For example, the relationship may be based on the equation:

$$I_{detector} = I_{source} * F(A_F, C_k) \quad (1)$$

where $I_{detector}$ is the count rate in the detector (or in an energy window of the detector spectrum), $I_{source}$ is the intensity of the source, $A_F$ are properties of the geological formation, such as density and PEF of formation and mud cake, mud cake thickness, and $C_k$ are the coefficients that depend on the endpoint energy of the photons. To determine the relationship between the values of equation (1), the data processing circuitry 28 may determine the coefficients $C_k$ at different energies using any suitable technique such as measurements in reference formations and/or modeling. Further, by using an equation with the same form at different endpoint energies, the data processing system 28 may ensure that there are no transition points that may cause discontinuities in the response. While this is used as an example, the relationship between the intensity of the source and the response of the detector may have a different form and the form and the coefficients of the equation may depend on the x-ray spectrum emitted by the source. To determine the properties of the geological formation, the data processing system 28 may use any suitable method, such as multiple linear regression, neural networks, spine-and-ribs, inversion, among others.

Figure 5:
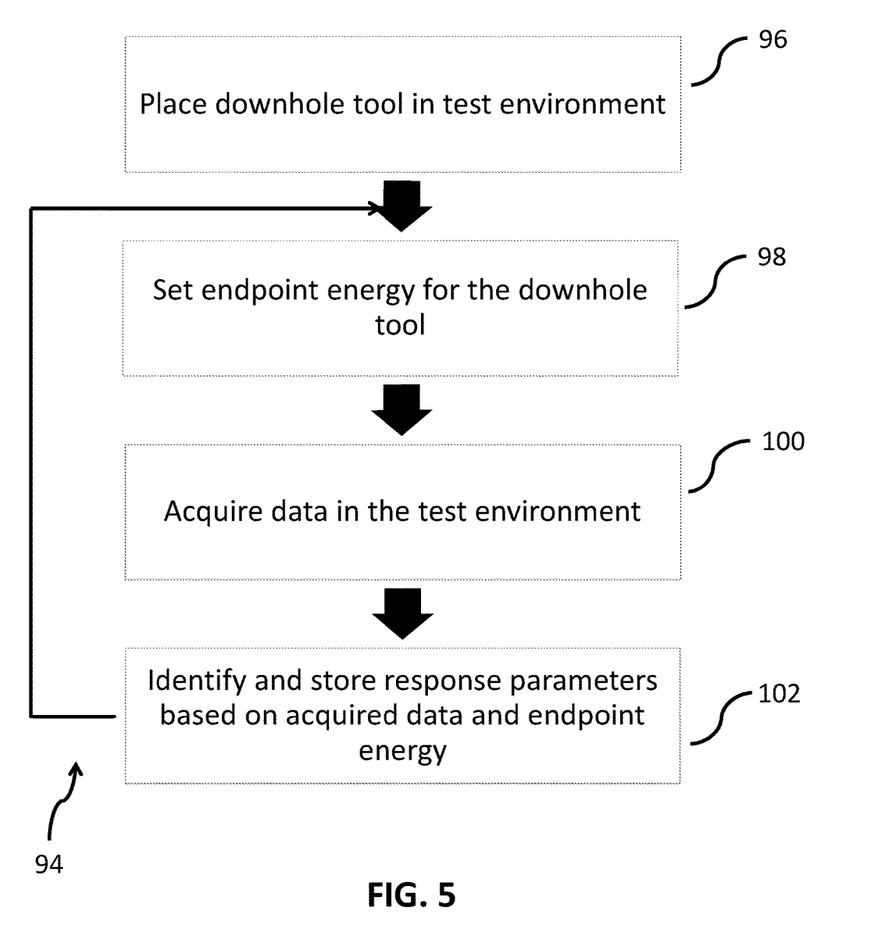
FIG. 5 is a flowchart of a method for calibrating or characterizing the downhole tool for different endpoint energies of photonic radiation.

FIG. 5 is a flowchart of a method 94 for calibrating and/or characterizing the downhole tool 12 for different endpoint energies of photonic radiation. That is, the method 94 may be performed for calibrating a specific individual downhole tool and/or for characterizing a number of tools of a type such that the characterized tools behave according to a broad statistical basis (e.g., in a less onerous manner than calibrating the tools individually). For example, a set of tools may be characterized initially and each tool of the set of tools may undergo a more specific calibration thereafter. The downhole tool 12 may be placed in a test environment 16 (block 96). For example, the data processing system 28 may acquire data related to reference formation having known formation properties. A first endpoint energy may be set for the downhole tool 12 (block 98). The data processing system 28 may then acquire data in the test environment (block 100). The processing system 28 may obtain response parameters based on the acquired data and endpoint energy of photons (block 102). For the first endpoint energy, the processing system 28 may then determine the relationship between the intensity of the source, the x-ray flux observed by the detector, and the reference formation properties, as shown in equation (1) described above.

In the illustrated embodiment, the processing system 28 then sets a second endpoint energy for the downhole tool, different from the first (block 98). For example, the second endpoint energy may be stepped up or stepped down from the first endpoint energy. In some embodiments, this may be performed while the downhole tool 12 remains placed in the test environment (e.g., without removing the downhole tool 12). The data processing system 28 may then acquire data in the test environment (block 100) and obtain operating parameters based on the acquired data and the second endpoint energy (block 102), similar to the process described above. Further, the processing system 28 may then determine the relationship (e.g., with a different coefficient or form than the relationship from the first equation) as shown in equation (1) above. The method 94 may continue with different formations, different endpoint energies, or the like. The tool 12 may be calibrated at energy steps of any suitable size. Further, the data processing system 28 may determine relationships at different endpoint energies between the energy steps (e.g., between the first and second endpoint energy) via interpolation, extrapolation, Monte Carlo modeling, or a combination thereof. For example, while performing a spine and ribs technique, there may be different polynomial equations for the spine and ribs that vary as a function of energy. An interpolation or Monte Carlo modeling may be used to fill in the coefficients of the equation(s) at energies that were not specifically calibrated. For a multi parameter inversion, the coefficients of the forward model may be a function of energy, for example taking into account the higher photoelectric sensitivity and the lower Compton sensitivity as the endpoint energy decreases. Moreover, the functional form of the technique may be changed at various endpoint energies. In some embodiments, the downhole tool 12 may be calibrated at different endpoint energies while the downhole tool 12 is turning on, i.e. while the endpoint energy is increasing during the ramp up of the high voltage on the x-ray tube.

Other downhole tools 12 may be constructed after the characterization of the first one. Minor differences in the sonde geometry and the electronics of these different tools that exist after manufacturing or that occur over time due to aging or wear can make these copies have different responses from the tool that was characterized. A calibration procedure may be performed to assess the changes in each tool and to correct the response to match the master tool. The calibration procedure may be modified to account for changes in the response at different energies. For example, the downhole tool 12 may be calibrated at multiple end point energies that correspond to predefined operational energy points of the downhole tool. In some embodiments, the downhole tool 12 may be calibrated at a maximum and minimum endpoint energy. Such calibration can then be used to adjust the interpolation of the coefficients as a function of the end point energy.

Figure 6:
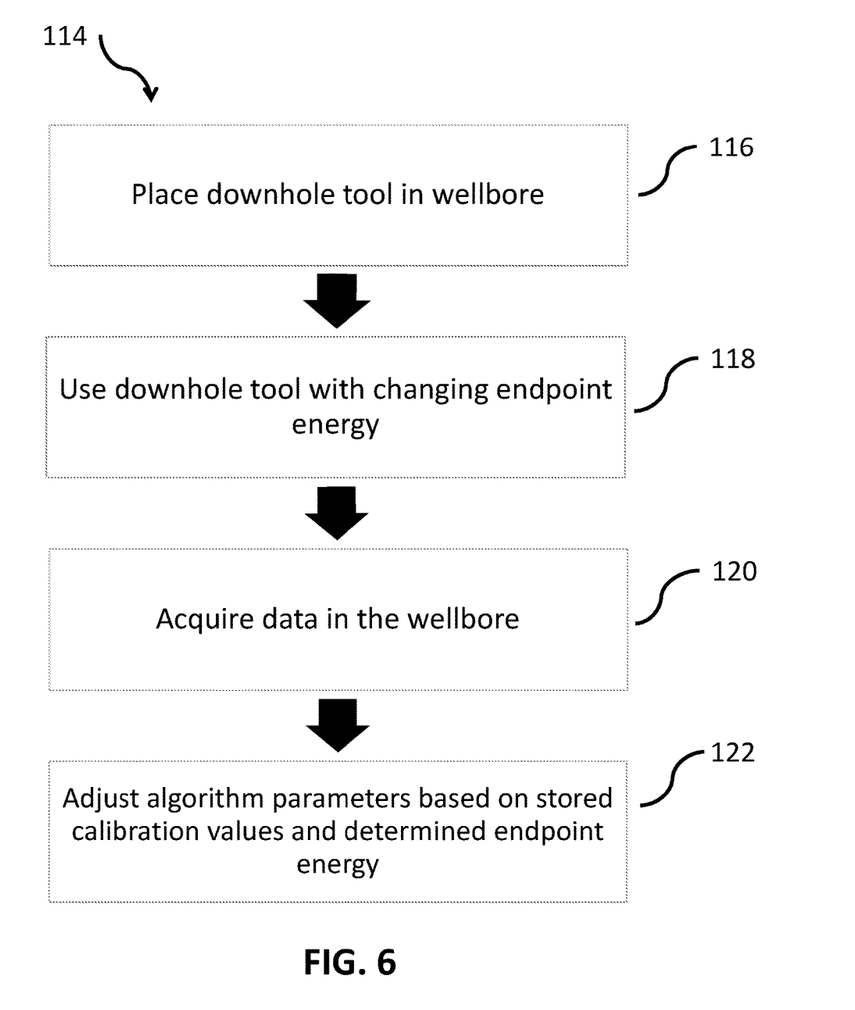
FIG. 6 is a flowchart of a method for obtaining properties of a geological formation at different endpoint energies of photonic radiation.

FIG. 6 is a flowchart of a method 114 for obtaining properties of the geological formation 14 at different endpoint energies of photonic radiation. Once the downhole tool 12 is characterized and/or calibrated, the downhole tool 12 may be placed in the wellbore 16 (block 116). The downhole tool 12 may then be used with changing endpoint energies (block 118). For example, the downhole tool 12 may operate at different endpoint energies during start up or due to changes in temperature. The data processing system 28 may then acquire data in the wellbore (block 120). The data processing system 28 may then adjust algorithm parameters based on stored calibration values and endpoint energy (block 122). For example, if the endpoint energy of the downhole tool 12 may fluctuate (e.g., due to temperature) between the first endpoint energy and the second endpoint energy, the data processing system 28 may apply the determined relationship from the calibration and the characterization process to the respective data associated with the respective endpoint energy. Additional data may be collected by the data processing system 28 at additional endpoint energies.

In some embodiments, the calibration values are parameters of one or more of a spine-and-rib analysis, a forward model analysis, an inversion analysis, a neural network analysis to determine the properties of the wellbore, the geological formation, or both. In some embodiments, the calibration values are adapted to account for variations in tool geometries.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

What is claimed is:

1. A method, comprising:
    lowering a downhole tool into a wellbore traversing a geological formation, said downhole tool comprises a photon source capable of operating at different endpoint energies and a detector;
    generating photons by the photon source;
    detecting, by the detector, photons after interacting with the wellbore, the geological formation, or both; and
    determining properties of a wellbore, a geological formation, or both, based on photons detected by the detector, endpoint energies of the photon source determined by an energy detection system, and calibration values predetermined at the different endpoint energies, wherein said determining comprises adjusting parameters of an algorithm linking the properties of the wellbore to the data acquired by the detector based on stored the calibration values and the endpoint energies.

2. The method of claim 1, wherein the calibration values comprises a relationship between photon fluxes and endpoint energies.

3. The method of claim 1, wherein the calibration values are parameters of one or more of a spine-and-rib analysis, a forward model analysis, an inversion analysis, a neural network analysis to determine the properties of the wellbore, the geological formation, or both.

4. The method of claim 1, wherein the calibration values are adapted to account for variations in tool geometries.

5. The method of claim 1, comprising detecting photons that are generated by the photon source but have not interacted with the wellbore and the geological formation with a reference detector.

6. The method of claim 5, wherein the endpoint energy is determined based on data acquired by the reference detector.

7. The method of claim 6, wherein the coefficient $C_k$ are determined based on stored the calibration values and the endpoint energies.

8. The method of claim 1, wherein determining properties of a wellbore, a geological formation, or both is based on the relationship:

$$I_{detector} = I_{source} * F(A_F, C_k) \qquad (1)$$

where $I_{detector}$ is the count rate in the detector, $I_{source}$ is the intensity of the source, $A_F$ are properties, and $C_k$ are the coefficients depending on the endpoint energy.

9. The method of claim 1, wherein the generated photons include x-rays.

10. The method of claim 1, wherein the properties of the wellbore or the geological formation comprise one or more of a formation density, a formation photoelectric factor, a mud cake thickness, a mud cake density, mud cake photoelectric factor, casing density, casing thickness, cement density, cement thickness and cement presence.

11. The method of claim 1, wherein the properties of the geological formation is the formation density.

\* \* \* \* \*